(12) United States Patent
Hernandez

(10) Patent No.: US 10,813,440 B1
(45) Date of Patent: Oct. 27, 2020

(54) CELLPHONE ATTACHMENT CORD APPARATUS

(71) Applicant: David Hernandez, Tooele, UT (US)

(72) Inventor: David Hernandez, Tooele, UT (US)

( * ) Notice: Subject to any disclaimer, the term of this patent is extended or adjusted under 35 U.S.C. 154(b) by 0 days.

(21) Appl. No.: 16/527,251

(22) Filed: Jul. 31, 2019

(51) Int. Cl.
| | |
|---|---|
| F16B 2/10 | (2006.01) |
| A45F 5/02 | (2006.01) |
| H04B 1/3888 | (2015.01) |
| A44B 11/26 | (2006.01) |
| A45F 5/00 | (2006.01) |

(52) U.S. Cl.
CPC ............. *A45F 5/02* (2013.01); *H04B 1/3888* (2013.01); *A44B 11/266* (2013.01); *A45F 2005/006* (2013.01); *A45F 2200/0516* (2013.01); *F16B 2/10* (2013.01)

(58) Field of Classification Search
CPC .... A45F 2200/0516; A45F 5/00; A45F 5/004; A45C 11/00
See application file for complete search history.

(56) References Cited

U.S. PATENT DOCUMENTS

| | | | |
|---|---|---|---|
| 6,799,354 B1 | 10/2004 | Goradesky | |
| 6,820,906 B1 * | 11/2004 | McClendon | .......... B60P 7/0853 294/104 |
| 6,888,940 B1 | 5/2005 | Deppen | |
| 7,374,142 B2 | 5/2008 | Carnevali | |
| D709,871 S | 9/2014 | Lee | |
| 9,427,070 B1 | 8/2016 | Bastian et al. | |
| 2007/0075914 A1* | 4/2007 | Bates | ...................... H01Q 1/44 343/895 |
| 2011/0006089 A1* | 1/2011 | Lifshitz | ................ A47D 13/025 224/160 |
| 2016/0095299 A1* | 4/2016 | Leon | .................... A01K 27/005 119/799 |
| 2016/0254083 A1 | 9/2016 | Bennett | |
| 2016/0286942 A1* | 10/2016 | Peterson | ................... A45F 5/00 |
| 2020/0028535 A1* | 1/2020 | McGrath | ................ A45C 11/00 |

* cited by examiner

*Primary Examiner* — Sam Bhattacharya

(57) ABSTRACT

A cellphone attachment cord apparatus for preventing cellphone drops includes a suspension clip configured to attach to an article of clothing or a clothing accessory. An elastic coil has a proximal end coupled to the suspension clip and a distal end. A buckle is coupled to the elastic coil and comprises a male mating member coupled to the distal end of the elastic coil and a female mating member. The male mating member and the female mating member are selectively engageable. A tether is coupled to the female mating member of the buckle. A mounting card is coupled to the tether. An adhesive layer is disposed on an inner face of the mounting card and is configured to be coupled to a cellphone case.

8 Claims, 4 Drawing Sheets

CELLPHONE ATTACHMENT CORD APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cellphone accessories and more particularly pertains to a new cellphone accessory for preventing cellphone drops.

BRIEF SUMMARY OF THE INVENTION

An embodiment of the disclosure meets the needs presented above by generally comprising a suspension clip configured to attach to an article of clothing or a clothing accessory. An elastic coil has a proximal end coupled to the suspension clip and a distal end. A buckle is coupled to the elastic coil and comprises a male mating member coupled to the distal end of the elastic coil and a female mating member. The male mating member and the female mating member are selectively engageable. A tether is coupled to the female mating member of the buckle. A mounting card is coupled to the tether. An adhesive layer is disposed on an inner face of the mounting card and is configured to be coupled to a cellphone case.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
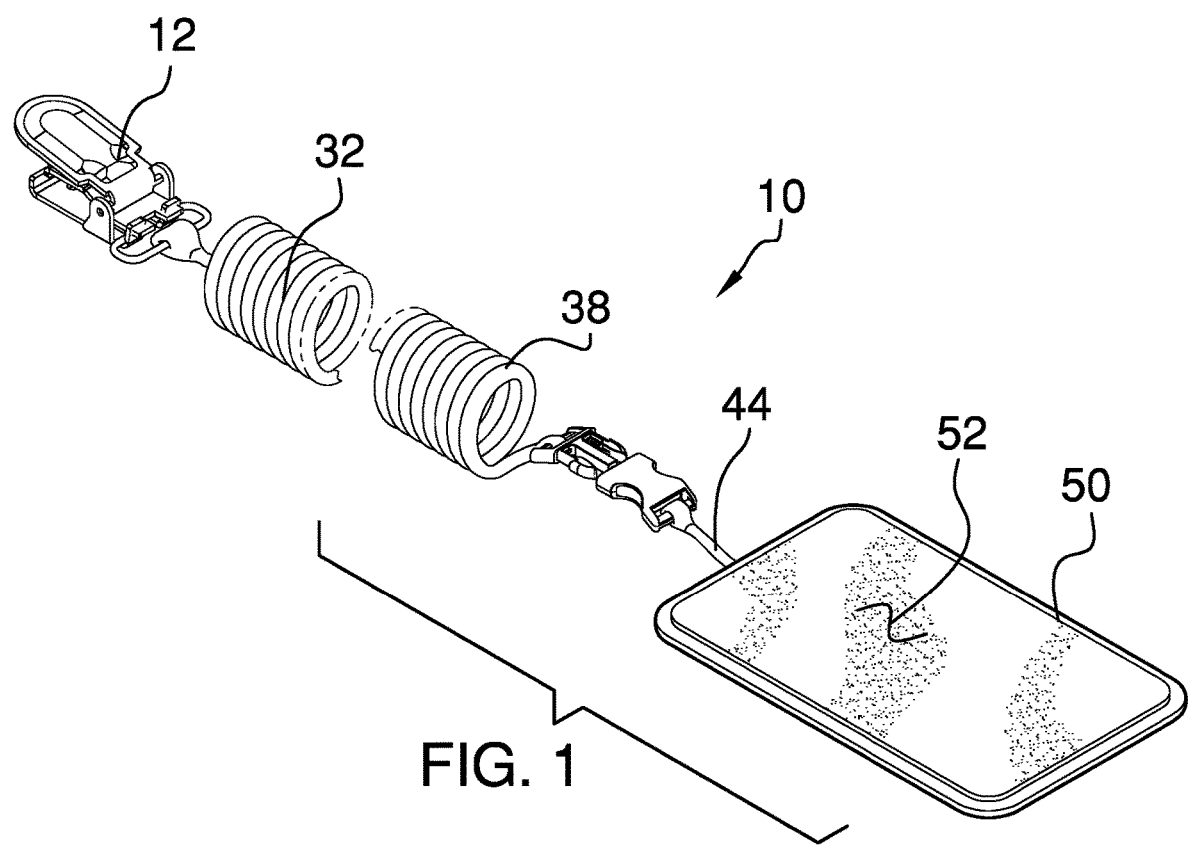
FIG. 1 is an isometric view of a cellphone attachment cord apparatus according to an embodiment of the disclosure.
Figure 2:
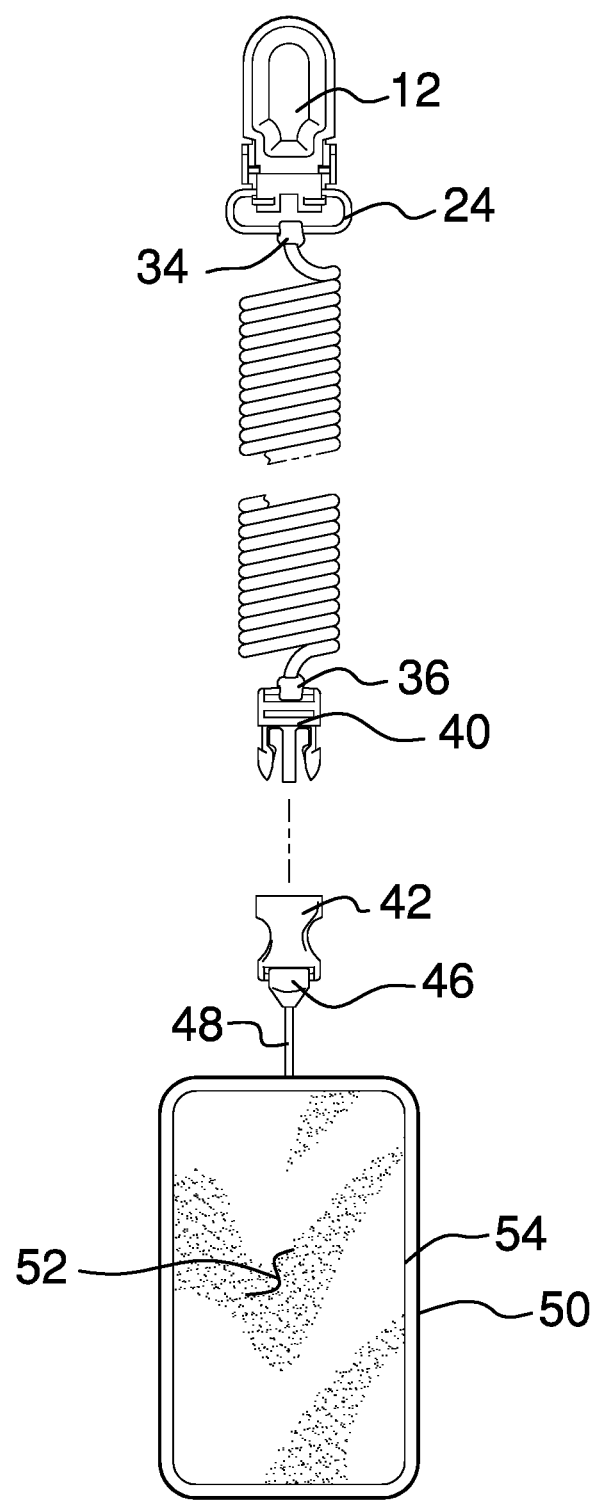
FIG. 2 is a front elevation view of an embodiment of the disclosure.
Figure 3:
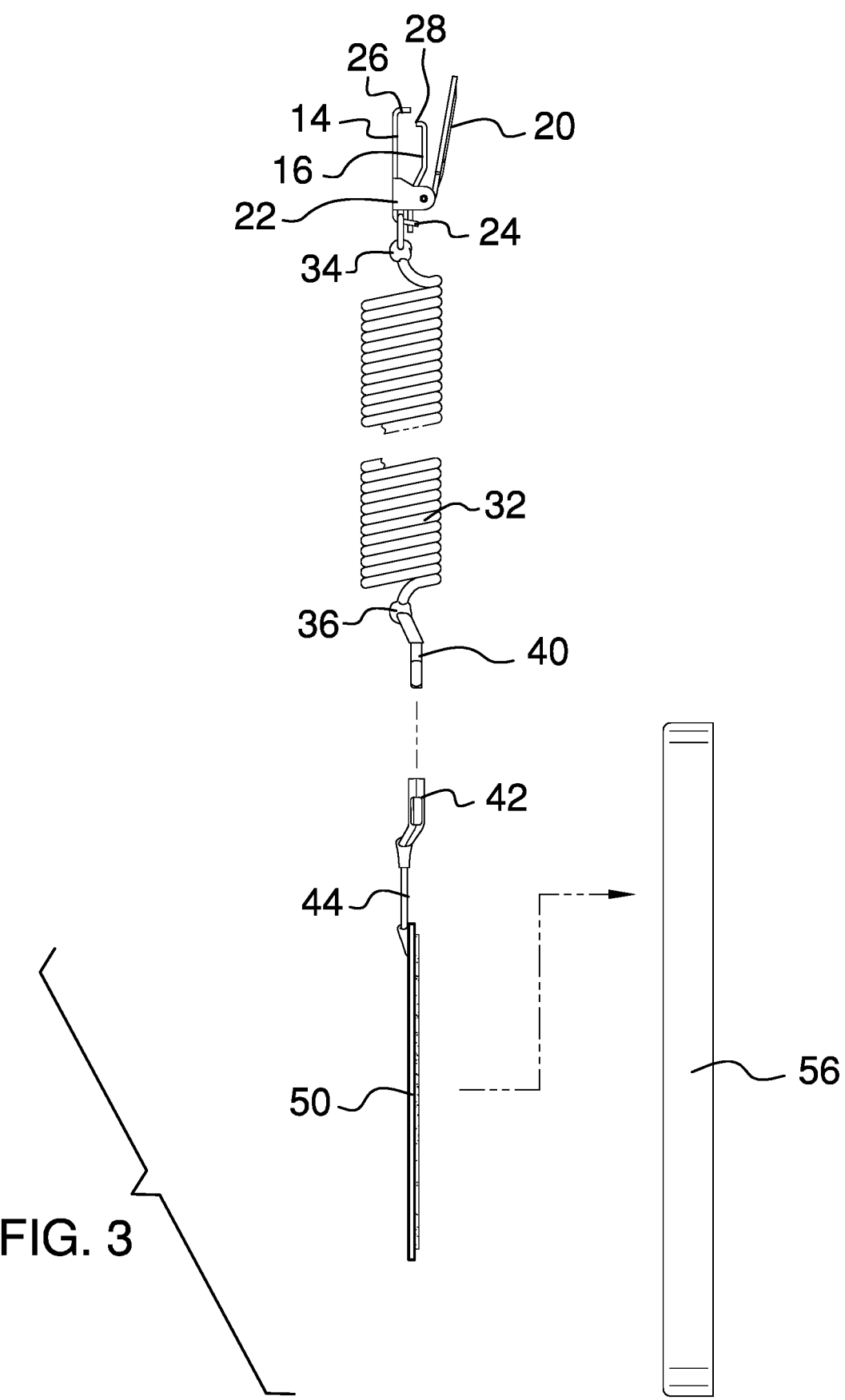
FIG. 3 is a side elevation view of an embodiment of the disclosure.
Figure 4:
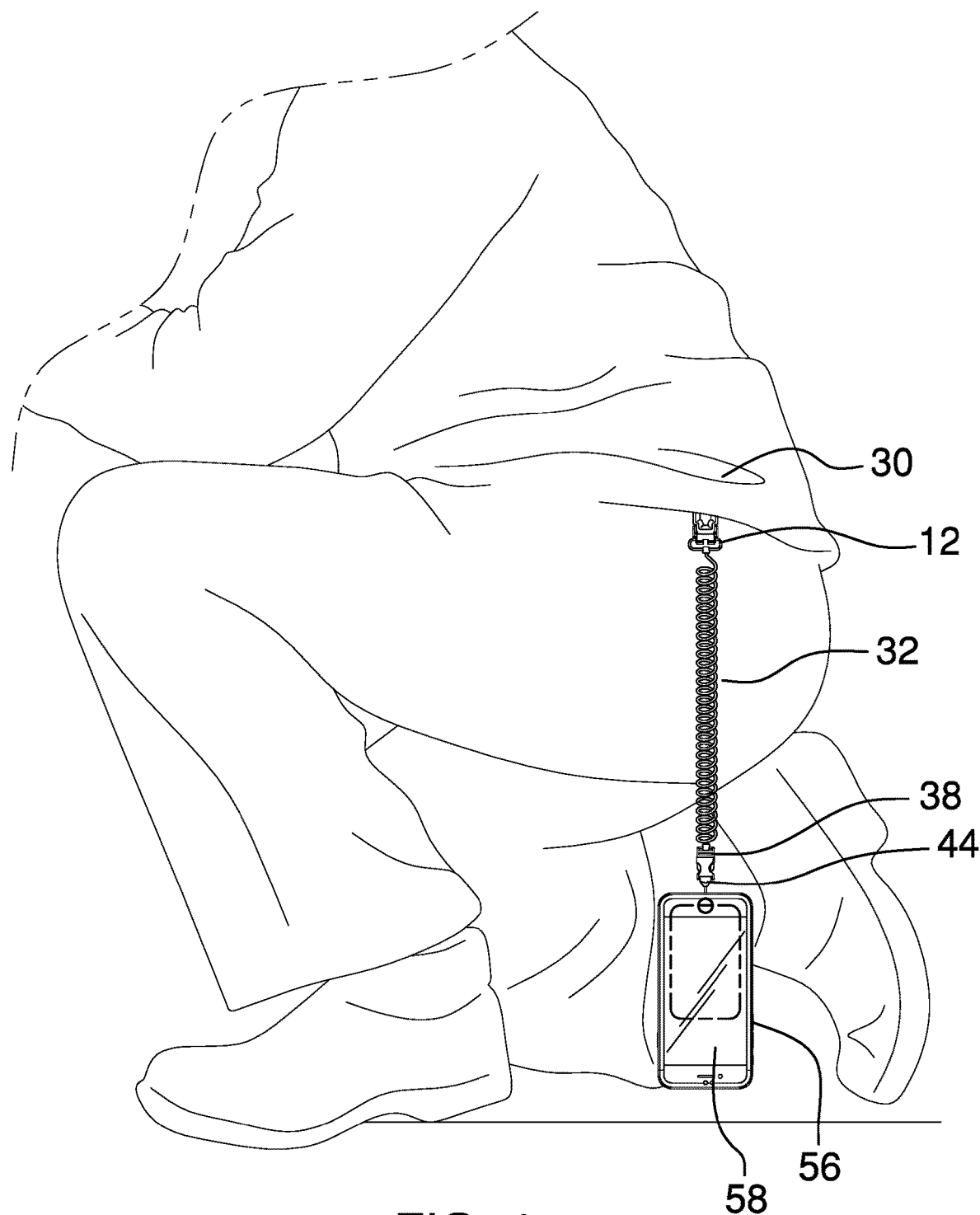
FIG. 4 is an in-use view of an embodiment of the disclosure.

With reference now to the drawings, and in particular to FIGS. 1 through 4 thereof, a new cellphone accessory embodying the principles and concepts of an embodiment of the disclosure and generally designated by the reference numeral 10 will be described.

As best illustrated in FIGS. 1 through 4, the cellphone attachment cord apparatus 10 generally comprises a suspension clip 12 having a bottom jaw 14 and a top jaw 16 coupled to a clip housing 18. A lever 20 is pivotably coupled to a pair of ears 22 of the clip housing and is in operational communication with the top jaw 16 to lockingly close the top jaw 16 against the bottom jaw 14 and alternatively to release the top jaw 16. An obround ring 24 is pivotably coupled to the clip housing 18. A length of the bottom jaw 14 is greater than a length of the top jaw 16 and less than a length of the lever 20. A bottom tip 26 of the bottom jaw and a top tip 28 of the top jaw each is bent inwards. The suspension clip 12 is configured to attach to an article of clothing 30 or a clothing accessory.

An elastic coil 32 is coupled to the suspension clip 12. The elastic coil 32 has a proximal end 34 coupled to the ring 24 of the suspension clip and a distal end 36. A buckle 38 is coupled to the elastic coil 32. The buckle 38 may be a parachute clip and comprises a male mating member 40 coupled to the distal end 36 of the elastic coil and a female mating member 42. The male mating member 40 and the female mating member 42 are selectively engageable to allow easy detachment from the elastic coil 32. A tether 44 is coupled to the buckle 38. The tether 44 has a hexagonal attachment portion 46 coupled to the female mating member 42 and a thin body portion 48 extending from the attachment portion 46. A mounting card 50 is coupled to the body portion 48 of the tether. An adhesive layer 52 is disposed on an inner face 54 of the mounting card. The adhesive layer 52 is configured to be coupled to a cellphone case 56 to fix the mounting card 50 to the cellphone case 56.

In use, a user places his cellphone 58 within the cellphone case 56 and adheres the adhesive layer 52 to the cellphone case 56. The suspension clip 12 is then attached to the article of clothing 30 and the cellphone 58 is thus attached to the user with the elastic coil 32, preventing accidental drops or misplacement. Should the user wish to detach the cellphone 58, the female mating member 42 and the male mating member 40 are disengaged.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cellphone attachment cord apparatus comprising:
   a suspension clip, the suspension clip being configured to attach to an article of clothing or a clothing accessory;
   an elastic coil coupled to the suspension clip, the elastic coil having a proximal end coupled to the suspension clip and a distal end;
   a buckle coupled to the elastic coil, the buckle comprising a male mating member coupled to the distal end of the elastic coil and a female mating member, the male mating member and the female mating member being selectively engageable;
   a tether coupled to the buckle, the tether being coupled to the female mating member; and
   a mounting card, the mounting card having an outer face, the outer face being planar;
   a connector positioned on the outer face of the mounting card, the connector having a planar edge positioned flush with a peripheral edge of the mounting card, the connector having an outer surface being planar and angled extending from the planar edge to the outer face of the mounting card such that the connector tapers extending inwardly from the peripheral edge of the mounting card, the tether being coupled to the and extending outwardly from the planar edge of the connector; and
   an adhesive layer being disposed on an inner face of the mounting card, the adhesive layer being configured to be coupled to a cellphone case.

2. The cellphone attachment cord apparatus of claim 1 further comprising the suspension clip having a bottom jaw and a top jaw coupled to a clip housing, a lever being pivotably coupled to a pair of ears of the clip housing and in operational communication with the top jaw to lockingly close the top jaw against the bottom jaw and alternatively to release the top jaw, and an obround ring pivotably coupled to the clip housing.

3. The cellphone attachment cord apparatus of claim 2 further comprising a length of the bottom jaw being greater than a length of the top jaw and less than a length of the lever.

4. The cellphone attachment cord apparatus of claim 2 further comprising a bottom tip of the bottom jaw and a top tip of the top jaw each being bent inwards.

5. The cellphone attachment cord apparatus of claim 1 further comprising the tether having a hexagonal attachment portion coupled to the female mating member and a thin body portion extending from the attachment portion to the mounting card.

6. The cellphone attachment cord apparatus of claim 1 further comprising the buckle being a parachute clip.

7. A cellphone attachment cord apparatus comprising:
   a suspension clip, the suspension clip having a bottom jaw and a top jaw coupled to a clip housing, a lever being pivotably coupled to a pair of ears of the clip housing and in operational communication with the top jaw to lockingly close the top jaw against the bottom jaw and alternatively to release the top jaw, and an obround ring pivotably coupled to the clip housing, a length of the bottom jaw being greater than a length of the top jaw and less than a length of the lever, a bottom tip of the bottom jaw and a top tip of the top jaw each being bent inwards, the suspension clip being configured to attach to an article of clothing or a clothing accessory;
   an elastic coil coupled to the suspension clip, the elastic coil having a proximal end coupled to the suspension clip and a distal end;
   a buckle coupled to the elastic coil, the buckle being a parachute clip and comprising a male mating member coupled to the distal end of the elastic coil and a female mating member, the male mating member and the female mating member being selectively engageable;
   a tether coupled to the buckle, the tether having a hexagonal attachment portion coupled to the female mating member and a thin body portion extending from the attachment portion; and
   a mounting card coupled to the tether, the mounting card being coupled to the body portion, an adhesive layer being disposed on an inner face of the mounting card, the adhesive layer being configured to be coupled to a cellphone case.

8. A cellphone case and cellphone attachment cord apparatus combination comprising:
   a suspension clip, the suspension clip having a bottom jaw and a top jaw coupled to a clip housing, a lever being pivotably coupled to a pair of ears of the clip housing and in operational communication with the top jaw to lockingly close the top jaw against the bottom jaw and alternatively to release the top jaw, and an obround ring pivotably coupled to the clip housing, a length of the bottom jaw being greater than a length of the top jaw and less than a length of the lever, a bottom tip of the bottom jaw and a top tip of the top jaw each being bent inwards, the suspension clip being configured to attach to an article of clothing or a clothing accessory;
   an elastic coil coupled to the suspension clip, the elastic coil having a proximal end coupled to the suspension clip and a distal end;
   a buckle coupled to the elastic coil, the buckle being a parachute clip and comprising a male mating member coupled to the distal end of the elastic coil and a female mating member, the male mating member and the female mating member being selectively engageable;
   a tether coupled to the buckle, the tether having a hexagonal attachment portion coupled to the female mating member and a thin body portion extending from the attachment portion;
   a mounting card coupled to the tether, the mounting card being coupled to the body portion; and a cellphone case coupled to the mounting card, the cellphone case being coupled to an inner face of the mounting card, the cellphone case being configured to secure a cellphone.

\* \* \* \* \*